Patented Dec. 19, 1939

2,183,981

UNITED STATES PATENT OFFICE 2,183,981

METHOD AND MATERIAL FOR TREATING FRUIT

William W. Bennett, Alhambra, Calif.

No Drawing. Application January 10, 1938, Serial No. 184,246

11 Claims. (Cl. 99—168)

This invention relates generally to a process for treating fruit to clean the fruit and to preserve it from oxidization and decay, and to protect it from injury caused by changes in temperature. More particularly this invention relates to a process of preparing a cleaning and preserving agent for the treatment of fruit and to the products of the process. The application is a continuation in part of my co-pending application, Serial No. 8,488.

It is a primary object of this invention to provide a simple, inexpensive and practical way of cleaning, sterilizing and coating fruit—particularly citrus fruit—to preserve the fruit from deterioration, decay or injury resulting from handling of the fruit or from temperature changes such as occur in the shipping of fruit from orchards to regions of colder climate.

It is an object of this invention to provide a method of preparing a stable alkaline emulsion suitable in all respects for the cleaning, sterilizing and coating of the fruit. It is also an object of this invention to provide a new and improved stable alkaline emulsion by the method of this invention which can be used for the cleaning, sterilizing and coating of the fruit and which, when so used, is superior to anything used for such purposes at the present time.

It is a further object of this invention to provide a process for forming a new compound which will be termed a pyrolyzed vegetable oil-mineral oil compound. It is also a further object of this invention that at an intermediate stage of the process a new compound is produced which will be termed a pyrolyzed animal-vegetable acid fat.

Where fruit has been acid washed, as must be done where poisonous sprays of the lead arsenate type have been applied during the growing season, the acid treatment alters and damages the natural wax film of the fruit and very nearly entirely removes it from the surface of the fruit. It therefore is a particular object of this invention to provide a stable alkaline emulsion which is suitable for use in a process for washing and treating fruit for removing any traces of the acid remaining upon the fruit and for giving the fruit a thin wax-like coating which possesses all of the advantages of the natural wax film which has been removed by the acid treatment.

These and other objects will be apparent from the following description.

The preparation and manufacture of the stable alkaline emulsion of this invention comprises generally: first, the incorporation of suitable acidulated fats; second, the step of subjecting the acidulated fats to heat treatment; third, the incorporation of the resulting product of the previous steps with a suitable mineral oil; fourth, preferably the incorporation of the product of the previous steps with an oil soluble substance which, in the absence of organic solvents, has a wax-like or resin-like character; and fifth, the incorporation of the product of the previous steps at a suitable temperature with water containing a suitable dissolved basic substance. The following description is an amplification of the above general outline.

As beginning materials an acidulated animal fat, for example an acidulated tallow of 47 titre, and an acidulated vegetable fat, for example an acidulated coconut oil of 26 titre, are used. These two fats are placed together in a large receptacle, such as a large kettle, in the proportion of 4½ parts by weight of the acidulated animal fat to 25 parts by weight of the acidulated vegetable fat.

The initial acidulated animal fat may be a tallow fatty acid made from the tallow of different animals, as for example beef tallow or mutton tallow, or it may be an acidulated fat made from any hard fat, including even a hydrogenated liquid fat or from any combination of these. The acidulated vegetable fat may be made from coconut oil, cottonseed oil, palm oil, rape-seed oil, olive oil, tomato-seed oil, peanut oil, sesame-seed oil, linseed oil, corn oil, soya-bean oil, tung oil, or any number of other liquid or semi-liquid oils, or any combination of these. Likewise, a hydrogenated or partially hydrogenated vegetable fat may be used, in whole or in part, for the vegetable fat. When I use a substitute for either the acidulated animal fat or the acidulated vegetable fat, or for both, as hereinbefore described, I change the proportion of the respective acidulated fats, as the conditions warrant.

Suitable heat is then applied to the receptacle or kettle containing the fats, heat being applied at such a rate that at the end of four hours the temperature of the mixture has reached 360° F. During the heating period the mixture is stirred at intervals to secure a homogeneous solution.

During the heating period certain chemical changes take place which cause the material to be readily soluble in mineral oils. In this connection it is pointed out that the original mixture of the two acidulated fats will not mix completely with mineral oils.

The original acidulated fats have been made from fats by a process of partial saponification, followed by acidification, and they are, therefore, complex mixtures of free fatty acids with glycerides of many kinds, belonging to the three groups of glycerides, viz., mono-, di-, and tri-glycerides. It is probable that the tri-glyceride content is low, the amount being in general high, when the titre is very low. The free fatty acids present in the acidulated vegetable fat are liquid fatty acids which are hereinafter designated as RCOOH (also R''COOH) and the free fatty acids in the acidulated animal fats are solid fatty acids, hereinafter designated as R'COOH.

When the mixture of the acidulated fats is heated, some hydrolysis of the glycerides takes place, due to the fact that water is slightly soluble in the oil, and also it is held in suspension to a greater or less extent, depending upon the degree to which an emulsion is present. While the oil is being heated, and before the water is driven off, there is a reaction between it and unsaponified fat producing an additional amount of free fatty acid. However, because of the limited solubility of water in the acidulated fat, and also because of its volatility, the extent of hydrolysis is not great. The fact that the titre of the fat increases during the heat treatment indicates that there is some hydrolysis. The type of reaction which takes place is shown below:

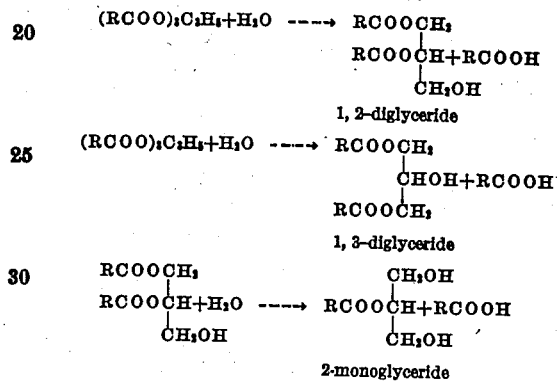

During the heat treatment a more profound change takes place, however. There is an exchange reaction of the glycerides with the free fatty acids. The reaction may involve any of the glycerides, i. e., mono-, di-, or tri-glycerides. A typical reaction would be that between a diglyceride from a solid, animal fat and a free fatty acid, RCOOH, from a liquid vegetable fat:

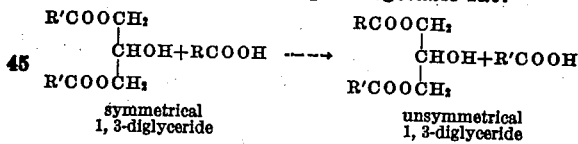

Another type of reaction is the conversion of a 1,2-diglyceride to a 1,3-diglyceride.

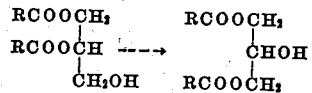

A result of the reaction of a symmetrical 1,3-diglyceride with a free fatty acid to form an unsymmetrical 1,3-diglyceride is a lowering of the melting point, for the unsymmetrical 1,3-diglycerides melt lower than either of the two symmetrical 1,3-diglycerides, i. e.,

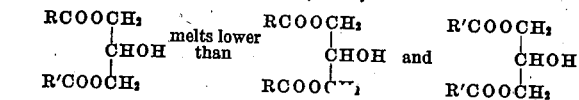

Likewise, the conversion of a symmetrically substituted 1,2-diglyceride to an unsymmetrically substituted 1,2-diglyceride (and similarly in the case of a symmetrical tri-glyceride) causes a lowering in the melting point. In the combination of fats used, that is, hard animal fats with oily vegetable fats, the lowering of the melting point is quite marked, because of the great dissimilarity in the two types of fat. The replacement of a solid fatty acid, R'COOH, characteristic of a solid fat by the liquid fatty acid, RCOOH, characteristic of a liquid fat, is a unique combination, for it produces a large effect in lowering the melting point.

Not only may one of the solid fatty acid residues R'COO in $(R'COO)_2C_3H_5OH$ be replaced by a liquid fatty acid residue, RCOO, but the other residue, R'COO, may be replaced by a second liquid fatty acid residue, R"COO. Also in a diglyceride of the type $(RCOO)_2C_3H_5OH$, a liquid fatty acid residue RCOO, may be replaced by a solid fatty acid residue R'COO. Moreover, a triglyceride of the type of $(R'COO)C_3H_5$ may be changed into a tri-glyceride of the type $(RCOO)(R'COO)(R"COO)C_3H_5$. In the conversion of $(R'COO)_2C_3H_5OH$ to $$(RCOO)(R"COO)C_3H_5OH,$$

of $(RCOO)_2C_3H_5OH$ to $(RCOO)(R'COO)C_3H_5OH$, and likewise of $(R'COO)_3C_3H_5$ to $$(RCOO)(R'COO)(R"COO)C_3H_5$$

a more symmetrical molecule is changed to a less symmetrical molecule. Likewise, R'COO may take the place of one RCOO in $(RCOO)_3C_3H_5$. All of these changes cause a drop in the melting point.

The change in the melting point is of great importance. It is well known that of two isomeric compounds, the one which has the lower melting point is more soluble in the usual organic solvents. Since the interchange of acid radicals in the glycerides produces a large lowering in the melting point, it follows that the resulting acid fat has a much higher solubility in organic solvents, for example mineral oil, than the unheated, acidulated fat.

It is proper to call the heat-treated acid fat a new combination of matter. The chemical changes which it has undergone are: (a) a small amount of hydrolysis; (b) a considerable amount of radical exchange; and (c) a certain amount of isomerization. The change in properties are: (a) an increase in the titre; (b) a decrease in the melting point; and (c) an increased solubility in organic solvents.

This new combination of animal and vegetable fats with animal and vegetable fatty acids will be termed a pyrolyzed animal-vegetable acid fat. It is called pyrolyzed to indicate that it has been subjected to a heat treatment. It is a mixture of animal and vegetable fats. It is also a fat which contains a certain amount of free fatty acids. The manner in which the fatty acids are combined with the glycerol in this pyrolyzed product is different from that of the naturally occurring fat, or from that of the acidulated animal or vegetable fat.

Having obtained this hot pyrolyzed acid fat, the next step in the process is the addition thereto, while still hot, of a suitable mineral oil, preferably a refined kerosene which is colorless and practically odorless, and preferably in the proportion of one part by volume of the acid fat to two parts of kerosene. In place of kerosene, gasoline may be used or some refined, colorless petroleum fraction of higher boiling point, for example stove distillate. It is not intended to limit the invention to the use of kerosene alone, but to include combinations of it with other refined mineral oil products, such as gasoline, stove distillate, paraffin oil and paraffin wax, and combinations of it with other hydrocarbons, for example terpenes, also combinations of it with other organic liquids, such as the higher alcohols, for example secondary hexyl alcohol. The relative amounts of pyrolyzed acid fat and kerosene are not necessarily those mentioned, for reasonable variations can be made.

The addition of a substance of the type indicated results in another new combination of matter which will be termed a pyrolyzed vegetable oil-mineral oil compound. Without the chemical changes which take place during the heat treatment, it is impossible to incorporate the acidulated fats into the mineral oil. The new vegetable-mineral oil compound will remain unaltered over long periods of time.

The value of my final emulsion-wash is greatly improved by the addition, at this stage, or to the hot, pyrolyzed vegetable oil-mineral oil compound, of a substance which is oil soluble and which, in the absence of organic solvents, has a wax-like or resin-like character. In practice it has been found that approximately 1% to 4% by volume produces a satisfactory result, but I prefer to use about 1% in the interest of economy. Such substances may be of natural origin, as for example a wax, i. e., carnauba wax, a resin, i. e., gum benzoin, or of synthetic origin, as for example a resin of the phenol-formaldehyde type, or a styrene resin, or a cumar resin, or some derivative of cellulose, as an ethyl cellulose. The preferred resins for the purpose are those obtained by condensing formaldehyde with para tertiary amyl phenol, p-tertiary butyl phenol, a cresol, or with phenol. These substances are readily soluble in the pyrolyzed acid fat and the value of such an addition to the pyrolyzed compound is discussed later.

It is not intended to limit the invention to the addition of a single natural resin or wax or of a single synthetic resin to the pyrolyzed vegetable oil-mineral oil compound, for I find that certain combinations can be used, as for example, a combination of an oil soluble natural resin with an oil soluble natural wax, a combination of an oil soluble natural resin with an oil soluble synthetic resin, a combination of an oil soluble natural wax with an oil soluble synthetic resin, a combination of one oil soluble synthetic resin with another oil soluble synthetic resin, or a combination comprising three or more different oil soluble resins or waxes.

The next step in preparing the emulsion for use in the packing house consists in adding the new compound to water in the presence of soda ash or borax. As an example, 1000 gallons of water is heated in a suitable tank to 130° or 140° F. Then 300 pounds of commercial borax is added, 60 pounds of TSP, 35 pounds of 40% anhydrous soap with a maximum titre of 38, and finally 6½ gallons of the pyrolyzed vegetable oil-mineral oil compound. This combination forms an emulsion of the oil in the water, and the emulsion remains permanently suspended. The same is ready for use at any time and it is only necessary that the temperature be brought to the proper level, namely approximately 90° to 120° F., depending upon the requirements of the packing house.

Here again, variations from the procedure above described are possible, and in some cases are desirable. For example, it is desirable to replace the borax, which is valuable for killing and controlling blue mould which attacks oranges, by a smaller amount of soda ash (usually 30 pounds) for controlling green mould, which attacks lemons. It is not necessary that the amounts above specified be adhered to rigorously, for a considerable variation in the amounts of the respective ingredients can be made without seriously changing the results. However, the proportions which I have described have been found to give the best results, and are the ones which I recommend. The soap may be varied as regards per cent and titre.

In place of soda or borax, the corresponding potassium compounds may be used. Also at times it is desirable to use a combination of the sodium compound or a combination of the sodium with the potassium compounds. Ammonia or ammonium hydroxide may be used, also organic derivatives of ammonia, i. e., organic bases, such as methyl amine, ethyl amine, and the ethanol amines, in particular triethanol amine.

An additional valuable property of the pyrolyzed vegetable oil-mineral oil compound is due to the presence of mono- and di-glycerides. Because of the free alcoholic hydroxyl group of the glycerine part of the molecule, the oil can combine with boric acid (and borates) when it is suspended in water. Because of this property, which is a useful one, it is possible to add borax to a suspension of the oil in water without the borax crystallizing out, as it would if the oil were not present. An additional feature is the greater stability of the oil emulsion resulting from the combination with the borax. It is well known that borax and boric acid form additional compounds with glycerol and with polyhydric alcohols.

The process of washing citrus fruit in the packing house is carried out as a part of the regular procedure, and involves no additional manipulation except that of replacing the materials used up in the process. For every 2000 boxes of fruit washed through 1000 gallons of emulsion solution, about 150 gallons of emulsion is displaced. To bring the remainder up to the original 1000 gallons, 15 pounds of dissolved borax, 10 pounds of dissolved TSP, 10 pounds of dissolved soap, 40% anhydrous, 38 titre, and 1 gallon of the new pyrolyzed vegetable oil-mineral oil compound is added. The whole is brought to 1000 gallons by the addition of water. It is possible to treat 40 to 60 cars of fruit before a complete change of tank load is necessary. During the process of washing the fruit, the dirt settles to the bottom of the tank, leaving the emulsified liquid clean. Any kind of water may be used in the tank, but of course it is preferable to have soft water.

The great advantage of my new process of treating citrus fruits consists in the ability to make the surface of the fruit clean and bright by the removal of all foreign material such as insect residues, spray residues and smudge oil residues. The process is superior to any other known process, for up to this time no one else has succeeded in accomplishing this result. Another advantage is the ability of my new oil to increase the antiseptic power of borax, possibly because it can hold the borax in solution. The usual packing house uses about 600 pounds of borax to 1000 gallons of water in order to obtain a sterile solution whereas I can obtain a sterile solution by the use of 300 pounds of borax.

From an operating point of view there is also the advantage that borax does not separate out on the machinery, as it does in the absence of my new compound. Still another advantage of my process is the protection given to the surface of the fruit by the thin wax-like film which remains after the evaporation of the water and the kerosene. This film protects the fruit from shrinkage by rendering evaporation more difficult. It makes a smoother surface, and thus improves the appearance and the feel. This makes it more attractive and adds to its sale value. The fruit resists oxidation and decay better because of the thin film, and this leads to better keeping qualities. The latter is enhanced by the presence of any residual borax to the film.

An additional advantage lies in the incorporation of a wax, or a synthetic resin, in the pyrolyzed oil. This improves the texture of the final film on the fruit, for it is harder, and on that account better resists film rupture, through handling. Thus shrinkage and attack by moulds are still further decreased, while the appearance and feel of the fruit are still further improved.

By the incorporation of the synthetic resin obtained by condensing formaldehyde with tertiary amyl phenol an additional value is added because any unchanged or unreacted formaldehyde or phenol exerts an antiseptic action, thus aiding in the suppression of moulds.

I claim as my invention:

1. In the process of preparing a mineral oil compound for use as described, the steps of: combining approximately 4½ parts by weight of acidulated animal fat and 25 parts by weight of acidulated vegetable fat, said acidulated fats being complex mixtures of free fatty acids with mono-, di- and tri-glycerides; heating the combined fats for a period of approximately four hours to bring the temperature of the fats to 360° F. at the end of the heating period, and agitating said fats at intervals during the heating period; adding a mineral oil to the mixed fats in the heated condition in the proportion of one part by volume of the fats to two parts by volume of the mineral oil thereby forming a pyrolyzed vegetable oil-mineral oil compound.

2. In the process of preparing a mineral oil compound for use as described, the steps of: combining approximately 4½ parts by weight of acidulated tallow of 47 titre and 25 parts by weight of acidulated coconut oil of 26 titre, said acidulated fats being complex mixtures of free fatty acids with mono-, di- and tri-glycerides; heating the combined fats for a period of approximately four hours to bring the temperature of the fats to 360° F. at the end of the heating period, and agitating said fats at intervals during the heating period; adding kerosene to the mixed fats in the heated condition in the proportion of one part by volume of the fats to two parts by volume of the kerosene thereby forming a pyrolyzed vegetable oil-mineral oil compound; and adding to the said compound approximately 1% by volume of an oil soluble resin of the phenol formaldehyde type.

3. In the process of preparing a mineral oil compound for use as described, the steps of: combining acidulated animal fat and acidulated vegetable fat, said acidulated fats being complex mixtures of free fatty acids with mono-, di-, and tri-glycerides; heating said combined fats for a period of approximately four hours so as to bring the fats gradually to a temperature of approximately 360° F. at the end of the heating period; and agitating said fats at intervals during the heating period.

4. In the process of preparing a mineral oil compound for use as described, the steps of: combining approximately four and one-half parts by weight of acidulated animal fat and twenty-five parts by weight of acidulated vegetable fat, said acidulated fats being complex mixtures of free fatty acids with mono-, di-, and tri-glycerides; heating said combined fats for a period of approximately four hours so as to bring the fats gradually to a temperature of approximately 360° F. at the end of the heating period; and agitating said fats at intervals during the heating period.

5. In the process of preparing a mineral oil compound for use as described, the steps of: combining acidulated animal fat and acidulated vegetable fat, said acidulated fats being complex mixtures of free fatty acids with mono-, di-, and tri-glycerides; heating said combined fats for a period of approximately four hours so as to bring the fats gradually to a temperature of approximately 360° F. at the end of the heating period; and adding a mineral oil to the mixture of said agitated and heated fats.

6. The process of preparing a mineral oil compound for use as described, the steps of: combining acidulated animal fat and acidulated vegetable fat, said acidulated fats being complex mixtures of free fatty acids with mono-, di-, and tri-glycerides; heating said combined fats for a period of approximately four hours so as to bring the fats gradually to a temperature of approximately 360° F. at the end of the heating period; adding a mineral oil to the mixture of said agitated and heated fats; and adding an oil soluble wax to the mixture of the fats and oil.

7. In the process of preparing a mineral oil compound for use as described, the steps of: combining acidulated animal fat and acidulated vegetable fat, said acidulated fats being complex mixtures of free fatty acids with mono-, di-, and tri-glycerides; heating said combined fats for a period of approximately four hours so as to bring the fats gradually to a temperature of approximately 360° F. at the end of the heating period; adding a mineral oil to the mixture of said agitated and heated fats; and adding an oil soluble resin to the mixture of the fats and oil.

8. A pyrolyzed animal-vegetable acid fat comprising free fatty acids with mono-, di-, and tri-glycerides, said free fatty acids being mixtures of animal and vegetable fatty acids and comprising approximately 11% of the pyrolyzed fat, said di- and tri-glycerides being mixed glycerides of animal and vegetable fatty acids.

9. A vegetable oil-mineral oil compound comprising a mineral oil and a pyrolyzed animal-vegetable acid fat, the latter comprising approximately 11% of the pyrolyzed fat free animal and vegetable fatty acids with mono-, di-, and tri-glycerides, said di- and tri-glycerides being mixed glycerides of animal and vegetable fatty acids.

10. A fruit treating oil, comprising an oil soluble wax, a mineral oil, and a pyrolyzed animal-vegetable acid fat, said last-mentioned ingredient comprising approximately 11% of the pyrolyzed fat free animal and vegetable fatty acids with mono-, di-, and tri-glycerides, said di- and tri-glycerides being mixed glycerides of animal and vegetable fatty acids.

11. A fruit treating oil, comprising an oil soluble resin, a mineral oil, and a pyrolyzed animal-vegetable acid fat, said fat comprising approximately 11% of the pyrolyzed fat free animal and vegetable fatty acids with mono-, di-, and tri-glycerides, said di- and tri-glycerides being mixed glycerides of animal and vegetable fatty acids.

WILLIAM W. BENNETT.